US012715020B2

(12) United States Patent
Van Neer et al.

(10) Patent No.: US 12,715,020 B2
(45) Date of Patent: Aug. 25, 2026

(54) MEMBRANE TRANSDUCER WITH IMPROVED BANDWIDTH

(71) Applicant: Nederlandse Organisatie voor toegepast-natuurwetenschappelijk onderzoek TNO, 's-Gravenhage (NL)

(72) Inventors: Paul Louis Maria Joseph Van Neer, Bergschenhoek (NL); Arno Willem Frederik Volker, Delft (NL); Hylke Broer Akkerman, Rosmalen (NL); Gerwin Hermanus Gelinck, Valkenswaard (NL); Antonius Maria Bernardus Van Mol, Veldhoven (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 1151 days.

(21) Appl. No.: 17/769,276

(22) PCT Filed: Oct. 29, 2020

(86) PCT No.: PCT/NL2020/050670
§ 371 (c)(1),
(2) Date: Apr. 14, 2022

(87) PCT Pub. No.: WO2021/086184
PCT Pub. Date: May 6, 2021

(65) Prior Publication Data

US 2024/0139772 A1 May 2, 2024

(30) Foreign Application Priority Data

Oct. 30, 2019 (EP) .................................... 19206202

(51) Int. Cl.
*B06B 1/06* (2006.01)
*B06B 1/02* (2006.01)

(52) U.S. Cl.
CPC .......... *B06B 1/0276* (2013.01); *B06B 1/0603* (2013.01); *B06B 1/0614* (2013.01)

(58) Field of Classification Search
CPC ... B06B 1/0276; B06B 1/0603; B06B 1/0614; B06B 1/06; B06B 1/0644
(Continued)

(56) References Cited

U.S. PATENT DOCUMENTS 3,947,644 A * 3/1976 Uchikawa ............. B06B 1/0688
310/334
2004/0085858 A1 5/2004 Khuri-Yakub et al.
(Continued)

FOREIGN PATENT DOCUMENTS

CN 101854866 A 10/2010
EP 2213239 A1 8/2010
(Continued)

OTHER PUBLICATIONS

European Patent Office, Examination Report in corresponding European Application No. 20800745.0, dated May 25, 2023 (7 pages).
(Continued)

*Primary Examiner* — Derek J Rosenau
(74) *Attorney, Agent, or Firm* — Leydig, Voit & Mayer, Ltd.

(57) ABSTRACT

An effective bandwidth in a membrane based ultrasonic transducer is improved by a control element (C). The control element (C) is disposed on a first side (10*a*) of a first membrane (10) of the transducer to increase or decrease a displacement amplitude of the first membrane (10) towards the first side (10*a*) and/or the opposite, second side (10*b*). This induces a displacement asymmetry (Za< >Zb) in a motion of the first membrane (10) during a first vibration (V1) of the first membrane (10) to the first side (10*a*)
(Continued)

compared to the second side (10*b*). The displacement asymmetry may result in improved bandwidth.

18 Claims, 5 Drawing Sheets

(58) Field of Classification Search
USPC .......................................... 310/309, 322, 334
See application file for complete search history.

(56) References Cited

U.S. PATENT DOCUMENTS

| | | | | |
|---|---|---|---|---|
| 2005/0162040 | A1* | 7/2005 | Robert | H03H 9/173 310/322 |
| 2010/0256498 | A1 | 10/2010 | Tanaka | |
| 2013/0121509 | A1 | 5/2013 | Hsu et al. | |
| 2016/0016198 | A1 | 1/2016 | Emadi et al. | |
| 2016/0315247 | A1 | 10/2016 | Boser et al. | |
| 2017/0194934 | A1 | 7/2017 | Shelton et al. | |
| 2019/0181776 | A1 | 6/2019 | Tumpold et al. | |
| 2019/0187102 | A1 | 6/2019 | Gerardo et al. | |
| 2022/0314274 | A1 | 10/2022 | Meynier et al. | |

FOREIGN PATENT DOCUMENTS

| | | | |
|---|---|---|---|
| EP | 4017650 | A1 | 6/2022 |
| JP | 2005117103 | A | 4/2005 |
| JP | 2006025109 | A | 1/2006 |
| JP | 2012119831 | A | 6/2012 |
| JP | 2012142652 | A | 7/2012 |
| JP | 2017225013 | A | 12/2017 |
| WO | 2006025109 | A1 | 3/2006 |
| WO | 2009063964 | A1 | 5/2009 |
| WO | WO 2014/134723 | A1 | 9/2014 |

OTHER PUBLICATIONS

Japanese Patent Office, Notice of Reasons for Refusal in corresponding Japanese Patent Application No. 2022-521975 dated Nov. 29, 2024.
European Patent Office, International Search Report in corresponding International Application No. PCT/NL2020/050670, dated Feb. 2, 2021 (3 pages).
China National Intellectual Property Administration, First Office Action in corresponding Chinese Application No. 202080076479.0, dated Jul. 20, 2023 (11 pages).

* cited by examiner

MEMBRANE TRANSDUCER WITH IMPROVED BANDWIDTH

CROSS-REFERENCE TO RELATED APPLICATIONS

This patent application is a U.S. National Phase of PCT International Application No. PCT/NL2020/050670, filed Oct. 29, 2020, which claims priority to European Application No. 19206202.4, filed Oct. 30, 2019, which are both expressly incorporated by reference in their entireties, including any references contained therein.

TECHNICAL FIELD AND BACKGROUND

The present disclosure relates to membrane based ultrasonic transducers, and methods for boosting an effective bandwidth of such transducers.

Ultrasonic transducers, e.g. sources and/or receivers, have various applications such as medical imaging, flow meters, et cetera. In order to boost the transmit and/or receive efficiency, resonance based ultrasonic sources/receivers such as membranes can be used. However, when the transducer is only effective near the resonance, this may limit the bandwidth and performance of the system. For example, the accuracy or imaging resolution of such transducers may depends on the system bandwidth.

There remains a need for improving bandwidth in membrane based transducers while maintaining at least some of the resonance based efficiency.

SUMMARY

Some aspects of the present disclosure relate to an ultrasonic transducer. The transducer comprises at least a first membrane configured to exhibit a first vibration at or near its resonance frequency to transceive (i.e. transmit and/or receive) ultrasonic waves, e.g. (resonantly) interacting with the first membrane. An electronic circuit is coupled to the first membrane and configured to transceive electrical signals causing, or caused by, the first vibration. A control element is disposed on a first side of the first membrane and configured to induce a displacement asymmetry in a motion of the first membrane during the first vibration to the first side compared to the opposite, second side. Other or further aspects related to a method of boosting an effective bandwidth in a membrane based ultrasonic transducer. For example, a control element is disposed on a first side of a first membrane of the transducer to increase or decrease a displacement amplitude of the first membrane towards the first side and/or the opposite, second side to induce a displacement asymmetry in a motion of the first membrane during a first vibration of the first membrane to the first side compared to the second side.

As explained herein, the inventors find that forcing nonlinear displacement, in particular asymmetry between the membrane moving during a resonant vibration to one side compared to the other side, may improve its bandwidth. The asymmetry can be induced e.g. by applying asymmetric forces on the membrane during its vibration cycle. Such forces may involve e.g. pressure build-up, electrostatic forces, and/or physical connections. Various combinations can be used to provide synergetic advantages as described herein.

BRIEF DESCRIPTION OF DRAWINGS

These and other features, aspects, and advantages of the apparatus, systems and methods of the present disclosure will become better understood from the following description, appended claims, and accompanying drawing wherein:

DESCRIPTION OF EMBODIMENTS

Figure 1A:
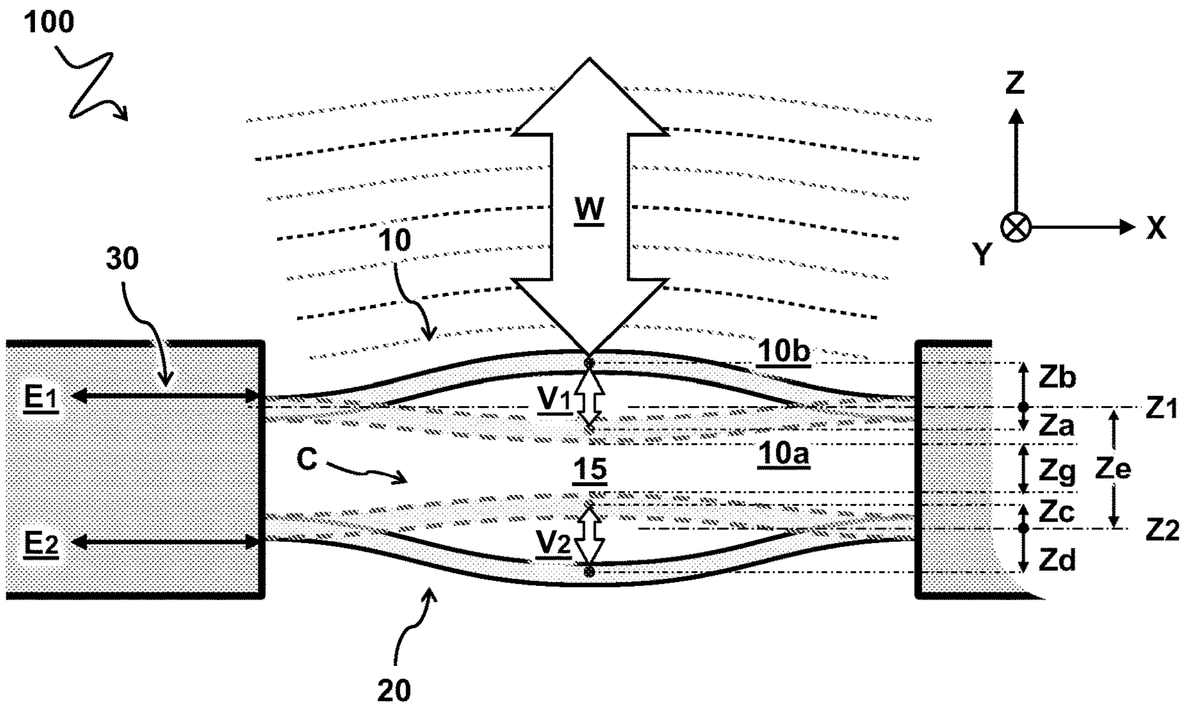
FIG. 1A illustrates inducing displacement asymmetry by vertically stacking two membranes close together.

Terminology used for describing particular embodiments is not intended to be limiting of the invention. As used herein, the singular forms “a”, “an” and “the” are intended to include the plural forms as well, unless the context clearly indicates otherwise. The term “and/or” includes any and all combinations of one or more of the associated listed items. It will be understood that the terms “comprises” and/or “comprising” specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise. Likewise it will be understood that when a connection between structures or components is described, this connection may be established directly or through intermediate structures or components unless specified otherwise.

The invention is described more fully hereinafter with reference to the accompanying drawings, in which embodiments of the invention are shown. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

FIGS. 1-4 illustrate increasing an effective bandwidth in a membrane based ultrasonic transducer 100. In the embodiments described herein, the ultrasonic transducer 100 comprises at least a first membrane 10. For example, the first membrane 10 is configured to exhibit a first vibration V1 (at or near its resonance frequency) to transceive (i.e. transmit and/or receive) ultrasonic waves W, e.g. (resonantly) interacting with the first membrane 10. Advantageously, a control element C can be provided on one or both sides of the membrane to induce a displacement asymmetry Za< >Zb in a motion of the first membrane 10. For example, the asymmetry is induced during the first vibration V1 to the first side 10*a* compared to the opposite, second side 10*b*.

In some embodiments, e.g. as shown, the first membrane 10 is configured to vibrate in a direction Z transverse to a plane XY of the first membrane 10 with respective amplitudes Za, Zb towards the first and second sides. In some embodiments, the first vibration V1 has a first amplitude Za between a (central) equilibrium position Z1 of the first membrane 10 and a maximum extended position of the first membrane 10 to the first side 10*a*. In other or further embodiments, the first vibration V1 has a different, second amplitude Zb between the equilibrium position and a maximum extended position of the first membrane 10 to the second side 10*b*. Preferably, the control element C is configured to affect the motion of the first membrane 10 for inducing a difference between the first and second amplitudes Za, Zb, e.g. wherein the difference is at least five percent, preferably at least ten percent, or even more than twenty percent, e.g. up to fifty percent or even hundred percent (factor two). For example, the amplitudes represent respective range of movement of a central point in the membrane from the equilibrium position (without actuating the membrane) to the respective sides (when the membrane is actuated by the electric signals E or ultrasonic waves W).

In one embodiment, the control element C is configured to reduce (e.g. resist, constrain, and/or restrict) motion of the first membrane 10 in one of the directions, towards the first side 10*a* or the second side 10*b*, compared to the opposite direction. For example, the range of motion is reduced by at least a factor 1.05, 1.1, 1.2, or more, e.g. up to a factor 1.5 or even two (i.e. the second amplitude Zb is at least ten percent higher than the first amplitude Za). In some embodiments, the control element C exclusively reduces membrane displacement in one of the directions, e.g. by added resistance, while having less or no effect in the other direction. In other or further embodiments, the control element C may reduce the membrane displacement in both directions, but to a different degree, e.g. providing more resistance in one direction than the other. Alternatively, or additionally to reducing displacement in one direction, it can also be envisaged that the control element C boosts membrane displacement in the other directions, e.g. by active control as will be discussed later.

Preferably, an electronic circuit 30 is coupled to the first membrane 10. In one embodiment, the electronic circuit 30 is configured to transmit electrical signals E1 causing the first vibration V1. In another or further embodiment, the electronic circuit 30 is configured to receive electrical signals E1 caused by the first vibration V1. In some embodiments, the electronic circuit 30 comprises a signal generator (not shown) configured to generate electrical signals E1 including one or more frequencies at or near the resonance frequency of the first membrane 10. In other or further embodiments, electronic circuit 30 comprises a signal detector (not shown) configured to detect electrical signals E1 including one or more frequencies at or near the resonance frequency of the first membrane 10.

While in principle the membranes may support different resonant vibrations, preferably the fundamental mode (e.g. designated as $u_{01}$ or 1s) with the lowest resonance frequency is used for efficiently generating or receiving the acoustic waves. For example, the resonance frequency Fr is determined, e.g., by one or more of the membrane material properties and diameter of the acoustic membranes. Also other or further parameters can be used, e.g. density, Poisson ratio and Young's modulus. In some embodiments, the fundamental frequency Fr (Hz) can be expressed using parameters such as the membrane tension T (N/m), density σ (kg/m$^2$), diameter D (m). Also other or further parameters can be used such as membrane thickness, elastic modulus, et cetera. Alternatively, or additionally, the fundamental frequency of the membranes can be determined by any other analytic or numeric modeling. In one embodiment, a specific resonance frequency Fr is determined by setting a specific diameter D in relation to the tension and density of the membrane. For example, the diameter D may correspond to half a wavelength at the resonance frequency of waves traveling in the membrane to produce a standing wave.

In a preferred embodiment, a piezoelectric transducer is used to actuate the membranes. Most preferably, piezoelectric material is disposed as a layer on the flexible membrane. Also other layers can be provided, e.g. electrode layers used to apply the respective electrical signals to the piezoelectric layer. Also capacity and/or conductive layers for applying electrostatic charges can be envisaged, as described herein. These layers may be charged by other or further electrical signals, e.g. applying static charges, or dynamic application of charge during a partial cycle of the respective vibration.

By driving the transducers with a carrier frequency at or around a respective resonance frequency of the transducers performance may be improved. For example, a first or ground resonance of the membrane is used. The resonance frequency of the transducers may be relatively high, e.g. more than one kiloHertz, more than ten kiloHertz, more than 100 kiloHertz or even more than one MegaHertz. Such high frequencies may not be suitable for all applications. For example, frequencies above eight hundred hertz may be difficult to feel for haptic applications. For example, an optimal frequency for haptic feedback may be between fifty and five hundred hertz, preferably between hundred and three hundred hertz.

In some embodiments, the electrical signals comprise multiple frequencies including a carrier frequency (as best as possible) corresponding to the resonance frequencies of the transducers; and an envelope or modulation frequency depending on the application. For example, a haptic feedback device may use a carrier frequency at 40 kHz which is amplitude modulated by a modulation frequency at 200 Hz. It can also be envisaged to use more than two frequencies, in particular a bandwidth of frequencies, e.g. including resonance frequencies of the respective transducers.

In some embodiments, an acoustic device is formed comprising an array of multiple acoustic transducers as described herein. For example, the transducers can be formed by a patterned stack on a flexible substrate. In one embodiment, the stack comprises a piezoelectric layer sandwiched between respective bottom and top electrode layers. In some embodiments, an actuation surface of the acoustic transducers includes part of the flexible substrate at the contact areas. In other or further embodiments, the membranes can be separately attached to a surrounding substrate.

Various types of control elements will now be described. In some embodiments, the control element C comprises a passive, e.g. constructive element adjacent the first membrane 10. Preferably, the adjacent control element C is not in direct contact with the first membrane 10. For example, having a pocket or other layer between the first membrane 10 and the control element C may allow a more smooth interaction. In other or further embodiments, the control element C may be actively controlled, e.g. wherein its effect on the first membrane 10 is adapted during a respective cycle of the first vibration V1.

FIG. 1A illustrates inducing displacement asymmetry (here Za<Zb) by vertically stacking two membranes 10,20 close together. In some embodiments, e.g. as shown, the control element C comprises a second membrane 20 disposed parallel to first membrane with a (closed) pocket 15 there between. For example, the displacement asymmetry can be caused by asymmetry between expansion or contraction of the pocket 15. Preferably, the pocket 15 is filled by a fluid, e.g. gas such as air, resisting compression when the pocket contracts causing a non-linear force on the first membrane as a function of its displacement towards the second membrane. For example, the fluid, e.g. air, in the pocket exerts an outward pressure on the membranes while a surrounding medium, e.g. air, exerts an inward pressure, e.g. atmospheric pressure, on the membranes. Typically the outward pressure increases when the pocket contracts and decreases when the pocket expands. For example, the outward pressure may increase non-linearly when the membrane moves inward.

In other or further embodiments, e.g. as shown, the parallel membranes are disposed apart with an equilibrium distance Ze there between. In a preferred embodiment, the distance Ze is relatively small to have sufficient effect. For example, the distance Ze may be comparable to the total deflection amplitude Za+Zb, e.g. less than twice this total amplitude. In another or further preferred embodiment, the parallel membranes are disposed at a distance Ze where they do not touch even when actuated. Accordingly, there can remain a gap distance Zg there between. For example, the equilibrium distance Ze between the membranes (when they are not actuated) is more than twice the inward (first) amplitude Za (i.e. Ze>2*Za). Accordingly, when the inward amplitude Zc of the second membrane 20 is similar to the inward amplitude Za of the first membrane 10, they will not touch when undergoing the respective vibrations V1, V2.

In some embodiments, the membranes have a diameter between half a millimeter and half a centimeter, preferably between one and three millimeter, e.g. two millimeter. Typically, the deflection or total amplitude of the membranes when resonating is much lower, e.g. lower than the diameter by at least a factor ten or hundred. For example, the total amplitude Za+Zb is between ten nanometer and hundred micrometer, preferably less than ten micrometer, or even less than one micrometer. In one embodiment, the distance Ze between the membranes is in a range between five nanometer and fifty micrometer, preferably less than ten micrometer, less than five micrometer, or even less than one micrometer. The smaller the distance the bigger the non-linear effect, e.g. up to but preferably excluding the distance where the membranes start touching (gap distance Zg=0).

In a preferred embodiment, the second membrane 20 is actuated to exhibit a second vibration V2 that is in counter-phase with the first vibration V1. In other words the adjacent membranes are configured to simultaneously move towards each other, or apart from each other. As will be appreciated by moving the second membrane in this way, the effect of the expanding/contracting pocket can be significantly enhanced. In other or further embodiments (not shown), it can also be envisaged to replace the second membrane 20 for a static or fixed layer/wall. For example, the pocket can be formed between the first membrane and static wall.

Figure 1B:
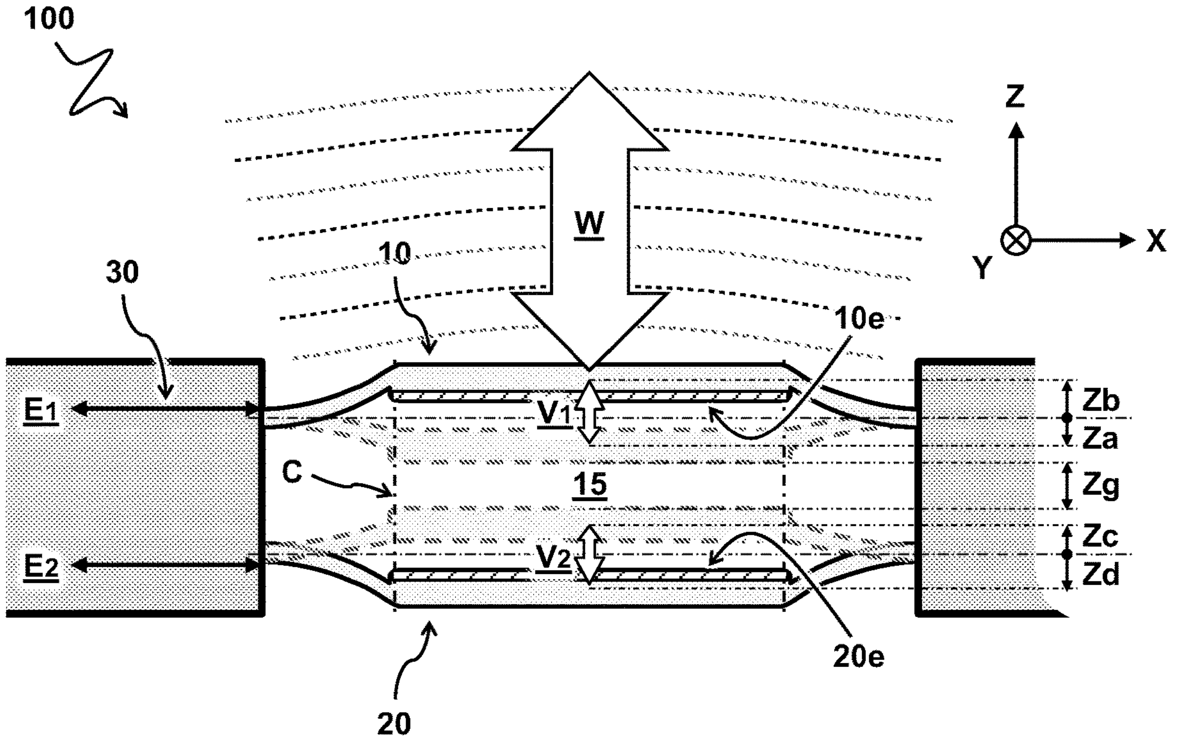
FIG. 1B illustrates embossing of membranes to further enhance the effect.

FIG. 1B illustrates embossing of membranes to further enhance the effect. In some embodiments, e.g. as shown, at least the first membrane 10 has a relatively thick and/or stiff section 10*e* at a center of the membrane compared to an (radial) edge of the membrane. For example, as illustrated by comparison between FIGS. 1A and 1B, this can have the effect of increasing the total displaced volume compared to peak out-of-plane displacement of the membrane. For example, the relatively thick or stiff central section in FIG. 1B may have less curvature during deflection (e.g. more block shaped than Gaussian) so the effect of the inward contraction can extends over a larger area than just the center peak compared to FIG. 1A.

In some embodiments, a center of the membrane is thicker than the edges, e.g. by at least a factor 1.1, 1.2. 1.5, 2 or more. In other or further embodiments, material at a center of the membrane is stiffer than at the edge, e.g. having a flexural rigidity [Pa·m$^3$] and/or Young's modulus [Pa] that is higher by at least a factor 1.1, 1.2. 1.5, 2 or more. Preferably, the thickened and/or stiffened region extends over a subsection of the total area, e.g. covering between fifty and ninety percent of the area, preferably between sixty and eighty percent. In some embodiments, the membrane is provided with an extra layer or embossing on at least one side, preferably the inward directed first side 10*a*. As will be appreciated, having extra material on one side, off centre with respect to the membrane central plane, may also contribute to the displacement asymmetry.

Figure 2A:
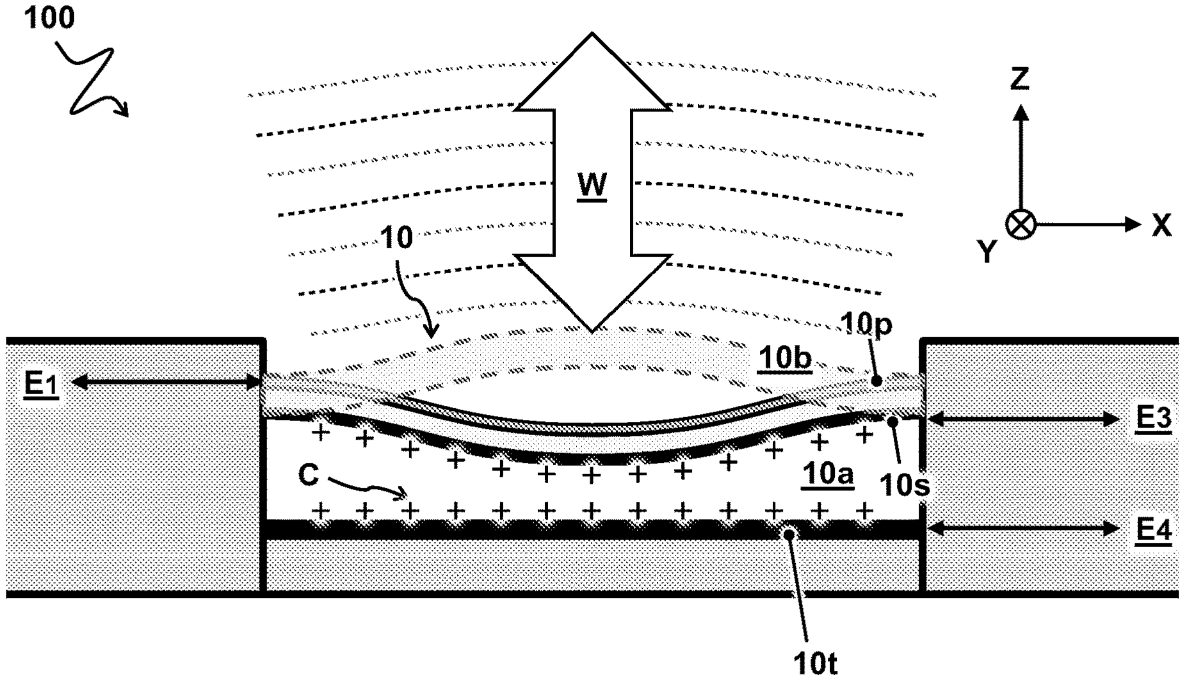
FIG. 2A illustrates inducing displacement asymmetry using electrostatic charges.

FIG. 2A illustrates inducing displacement asymmetry using electrostatic charges. In some embodiments, e.g. as shown, the control element C comprises an electrostatic device (not shown) configured to generate electrostatic charges on a surface of the first membrane 10, and on another opposing surface adjacent the first membrane 10. As will be appreciated, attraction and/or repulsion between the electrostatic charges (+−, ++, −−) may contribute to asymmetric forces on the first membrane 10 affecting its displacement in one or both directions. While the present figure shows repulsive (like) charges, also attractive charges could be used, e.g. to induce the asymmetry in the opposite direction. Also combinations are possible.

In some embodiments, e.g. as shown here, and similarly applicable to other embodiments as described herein, the first membrane 10 comprises a piezoelectric layer 10*p*. For example, the piezo piezoelectric layer 10*p* is coupled to the electronic circuit 30 for receiving and/or producing the electrical signals E1. For example, applying an alternating electrical signal to the piezoelectric layer 10*p* may cause contraction/expansion in the piezoelectric material which actuates the membrane, or vice versa.

In other or further embodiments, e.g. as shown, the first membrane 10 comprises an electrostatic layer 10*s*, e.g. of conductive material, for applying electrostatic charges. Preferably, as shown, the electrostatic layer 10*s* is on the first side 10*a* of the first membrane 10, e.g. facing the adjacent second electrostatic layer 10*t*. Most preferably, as shown, the electrostatic layer 10*s* is disposed on the first side 10*a* of the first membrane 10, while the piezoelectric layer 10*p* can be disposed e.g. on the opposite, second side 10*b*. Also other configurations are possible.

In some embodiments, the electrostatic device is configured to generate an alternating signal (AC) of electrostatic charges. For example, the application of electrostatic charges is synchronized with vibration of the membrane. In one embodiment, alternating electrical signals E1 can be used for actuating the piezoelectric layer 10*p* on the first membrane 10, while alternating charges are applied to the (separate) electrostatic layer 10*s*,10*t* for inducing the displacement asymmetry. For example, electrical (electrostatic) signals E3 and/or E4 can be applied to the respective electrostatic layers 10*s*,10*t*. Preferably, the electrostatic charges or signals E3,E4 are applied asymmetrically during each cycle of the vibrating membrane, e.g. only during one half of the cycle when the membranes are together, or during a half when they are apart.

In other or further embodiments, the control element C is configured to dynamically affect the membrane displacement during a respective vibration cycle. For example, electrostatic charge is dynamically varied to only exert force during part of a vibration cycle. In one embodiment, the electrostatic charge affects a stiffness of at least the first membrane 10.

Figure 2B:
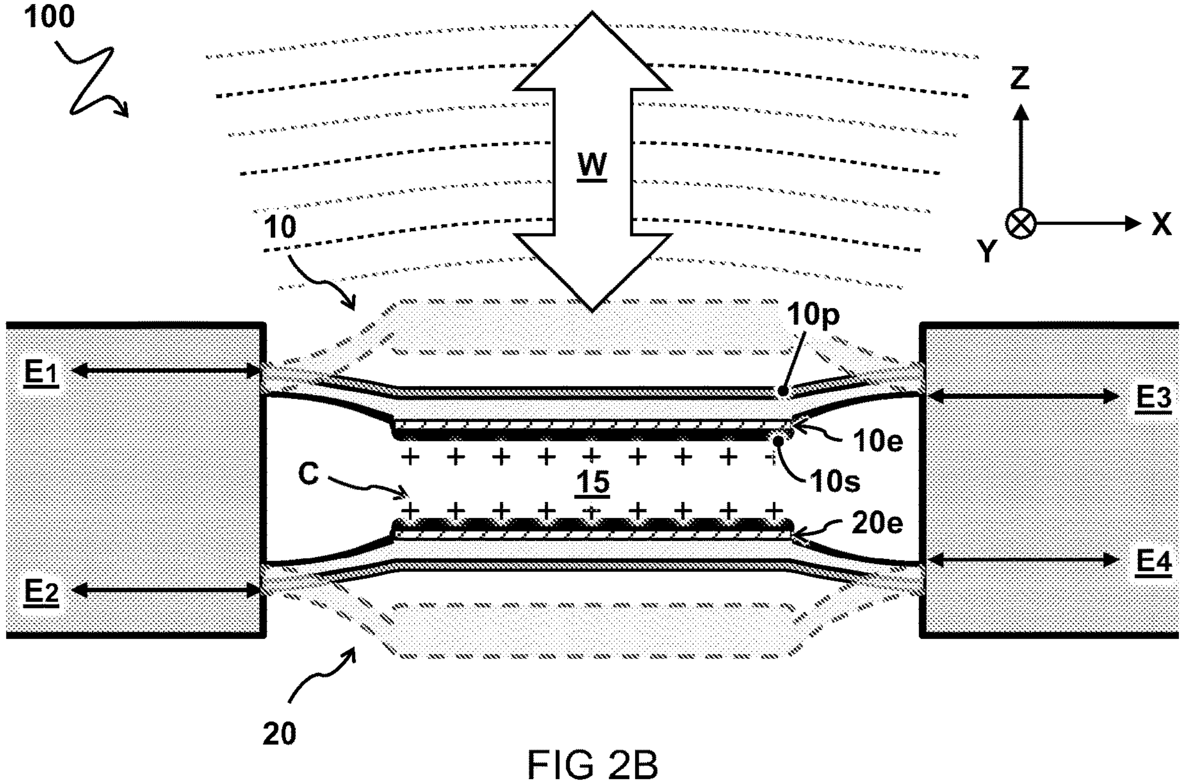
FIG. 2B illustrates using electrostatic charges in combination with a second membrane.

FIG. 2B illustrates using electrostatic charges in combination with a second membrane. In some embodiments, the electrostatic charge is generated on the second membrane 20. Such a combination may provide synergetic advantages of inducing asymmetry in according with the preceding embodiments. Alternatively, or additionally even further effect can be achieved by combining it with the first membrane 10 and/or second membrane 20 having a relatively thick and/or stiff section 10e at a center of the respective membrane. As will be appreciated, the relatively flat parts of the vibrating membranes may provide not only more displacement in the pocket, but also provide more area over which the charges can get within effective distance from each other. Also other advantageous combinations are possible, e.g. the thickened section only on the first membrane 10. For example, this can be applied to the single membrane 10 in FIG. 2A in combination with the fixed wall instead of the second membrane 20.

Alternatively, or in addition to the use of alternating signals (AC) to generate electrostatic charges, it can also be envisaged to apply continuous signals (DC). In some embodiments, the electrostatic device is configured to include a continuous signal (DC), or offset (DC component) in an alternating signal (AC), for applying the electrostatic charges, wherein the electrostatic charges are configured to change an equilibrium position of at least the first membrane 10. For example, a fixed or offset electrostatic charge on one or more membranes can be used to tune an equilibrium distance which can be off-center. Again, the effect may be larger in combination with a centrally thickened or stiffer section e.g. providing a more block shaped deflection.

Figure 3A:
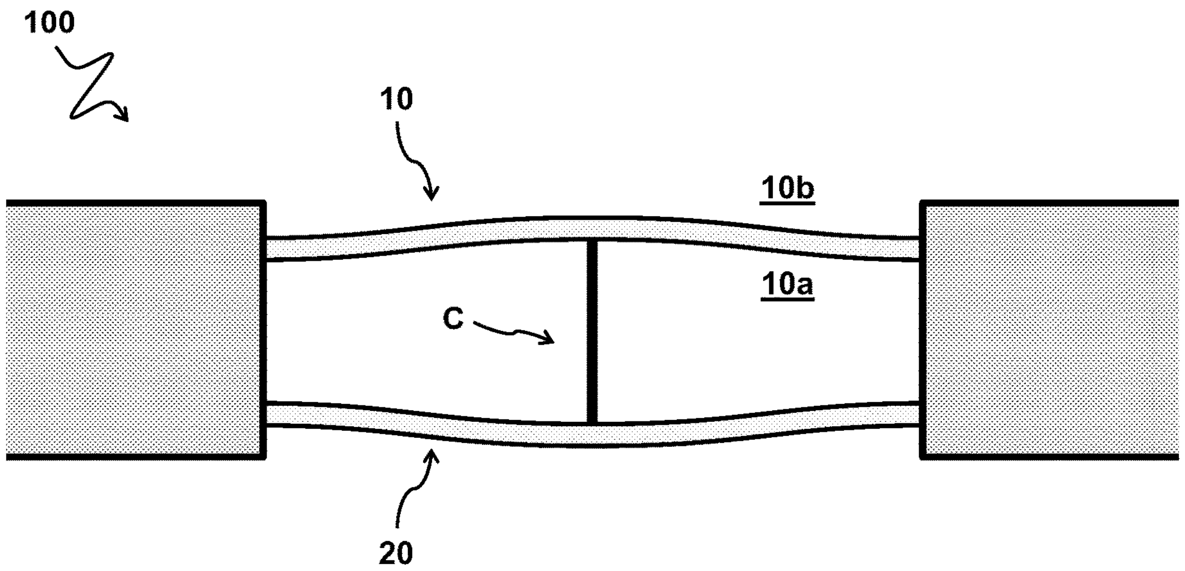
FIGS. 3A-3C illustrates inducing displacement asymmetry by using foldable structure to constrain movement in one direction above a threshold.
Figure 3B:
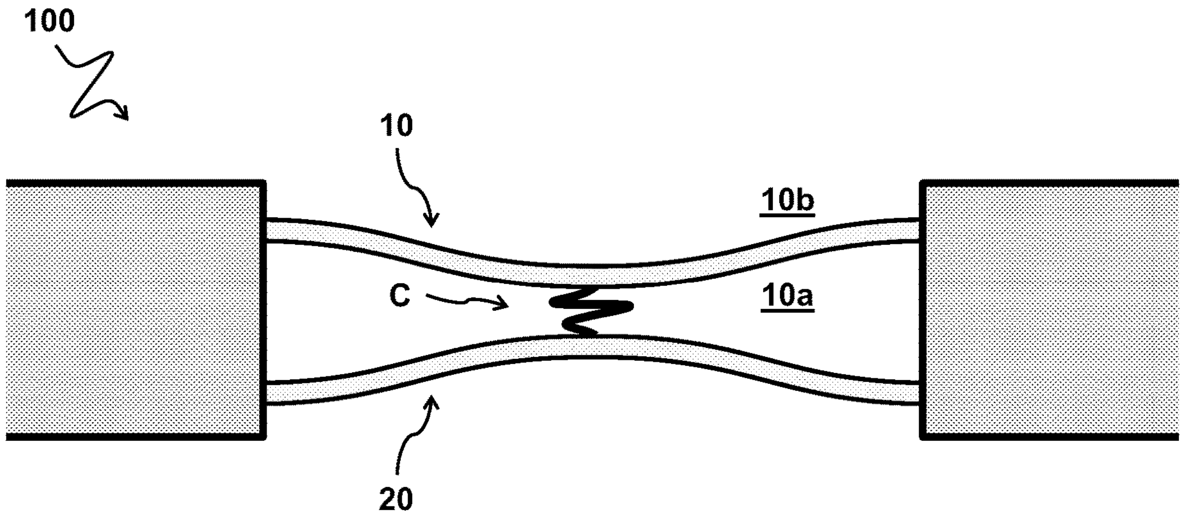
Figure 3C:
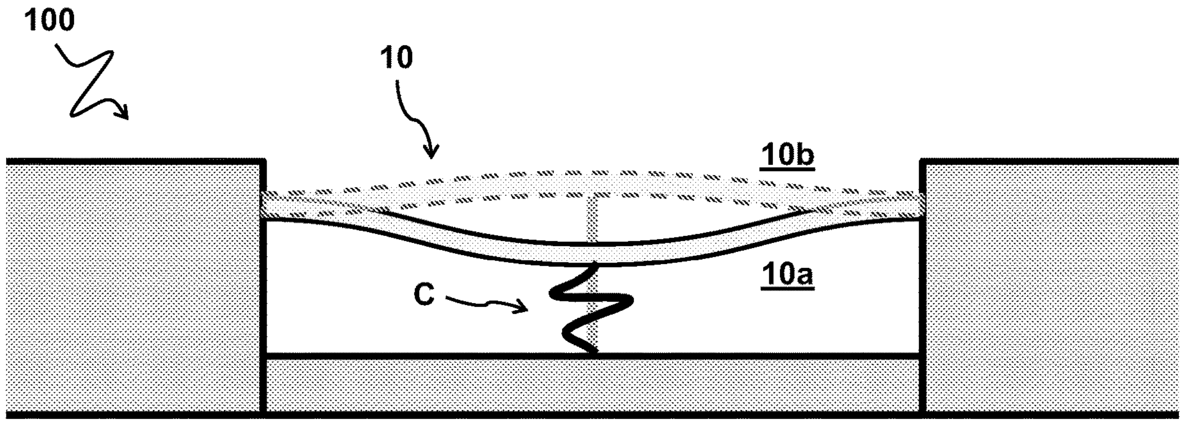

FIGS. 3A-3C illustrates inducing displacement asymmetry by using foldable structure to constrain movement in one direction above a threshold.

In some embodiments, e.g. as shown, the control element C comprises a (physical) connection to a center of the first membrane 10 on the first side 10a. For example, the connection allows the (inward) displacement of the first membrane 10 towards the first side 10a but constrains the displacement to the second side 10b. In one embodiment, the displacement is constrained by the physical connection beyond a threshold displacement in direction of the second side 10b, e.g. beyond the center position or further. In one embodiment, the connection resists or substantially prevents the displacement beyond the threshold. Examples of such connection may include, e.g. a flexible thread/rope, more stiff element such as a pillar, resilient element such as a spring, et cetera. In some embodiments, the connection comprises a foldable structure, configured to fold (or slack) in the one direction, and pulling tight beyond a threshold displacement in the other direction.

In one embodiment, e.g. as illustrated in FIGS. 3A-3B, the connection connects the first membrane 10 to (a (center of) a second membrane 20. In another or further embodiment, e.g. as shown in FIG. 3C, the connection connects the first membrane 10 to static layer. Also other or further embodiments with connecting structures can be envisaged.

Figure 4A:
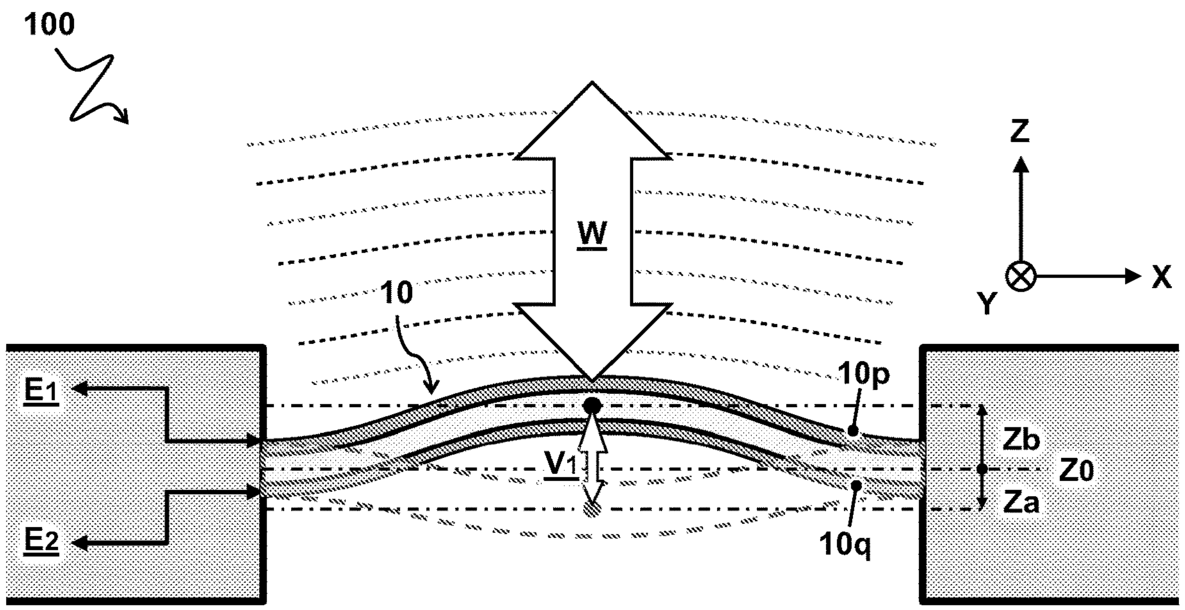
FIG. 4A illustrates inducing displacement asymmetry by using a second piezo layer on the first membrane to asymmetrically affect the membrane displacement

FIG. 4A illustrates inducing displacement asymmetry by using a second piezo layer 10q on the first membrane 10 to asymmetrically affect the membrane displacement. In some embodiments, the membrane comprises a first piezoelectric layer 10p for transceiving the electrical signals E1 related to the first vibration V1 of the first membrane 10. In other or further embodiments, the control element C comprises a second piezoelectric layer 10q, wherein the electronic circuit is configured to actuate the second piezoelectric layer 10q to dynamically change a characteristic of the first membrane 10 during a part of its vibration cycle V1.

Figure 4B:
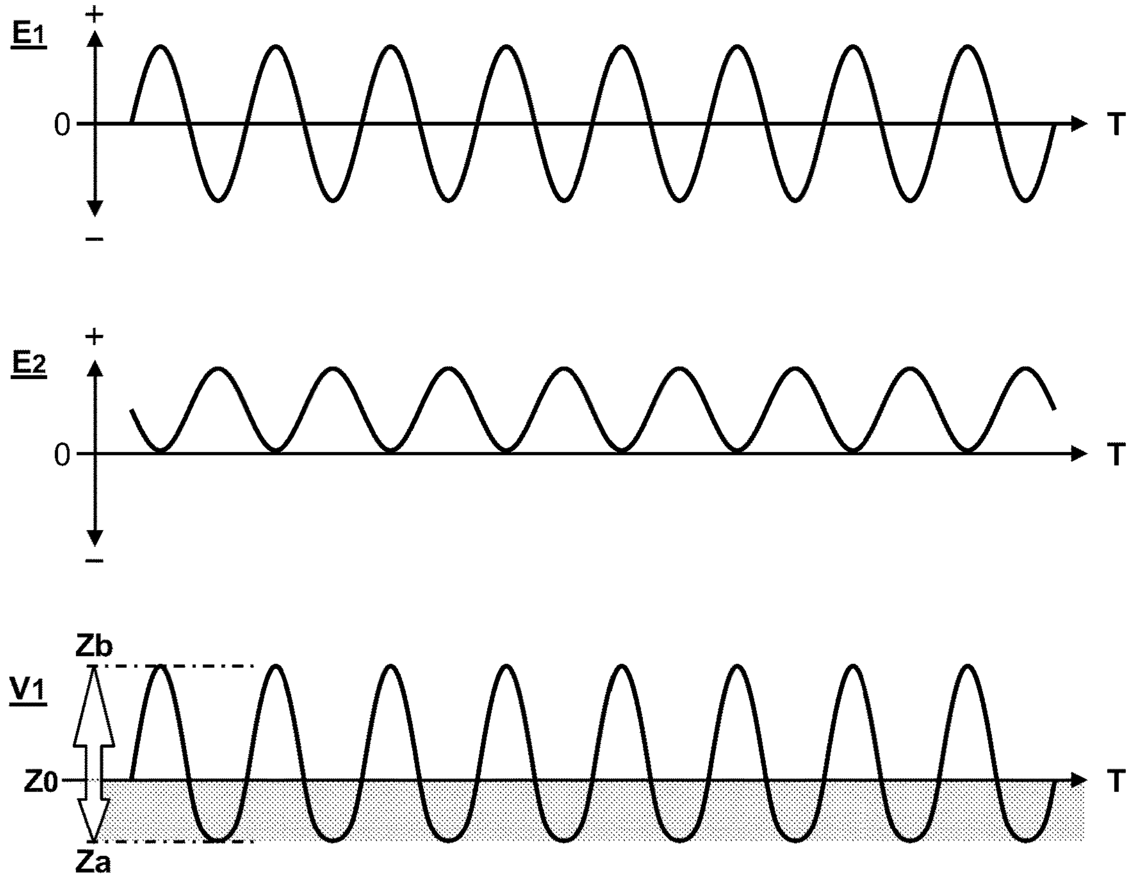
FIG. 4B illustrates application of different electrical signals as a function of time and resulting vibration.

FIG. 4B illustrates application of different electrical signals E1, E2 as a function of time T and resulting vibration V1. In some embodiments, a first electric signal is sent to (or received from) the first piezoelectric layer 10p and a different, second electric signal E2 is sent to the second piezoelectric layer 10q. In other or further embodiments, the second electric signal E2 is configured to actuate the second piezoelectric layer 10q during specific parts of first vibration V1. In one embodiment, the second electric signal E2 exclusively actuates the membrane during respective half cycles in one of the directions of the vibration cycle. For example, the second piezoelectric layer is actuated to counter or blunt the displacement in one of the directions Za. In this way the pressure pulse produced by the membrane actuated via the first piezoelectric layer 10p can be deformed (nonlinear) in said one direction compared to the other direction. Preferably, the second piezoelectric layer is disposed on an opposite side of the membrane with respect to the first piezoelectric layer. For example, the flexible membrane material is disposed between the piezoelectric layers 10p,10q.

Figure 5A:
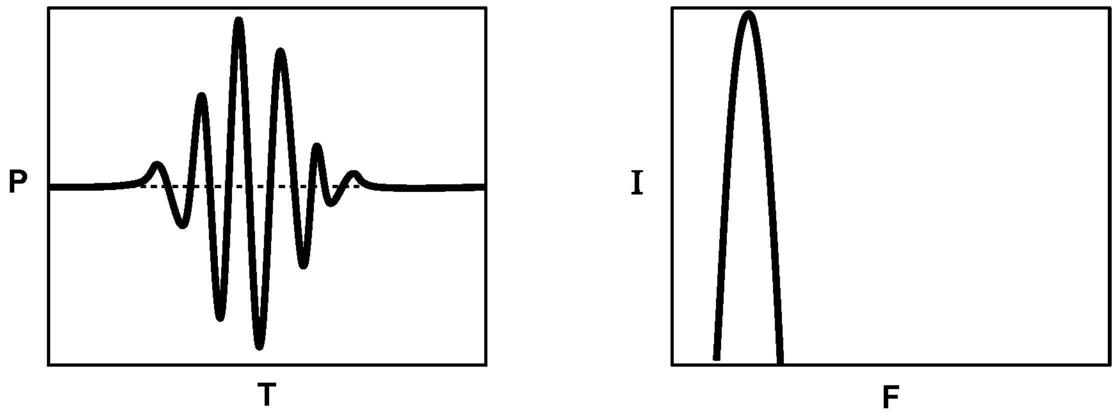
FIGS. 5A and 5B illustrates a comparison between a symmetric and asymmetric pressure pulse as function of time and intensity of the associated frequency spectrum (F)
Figure 5B:
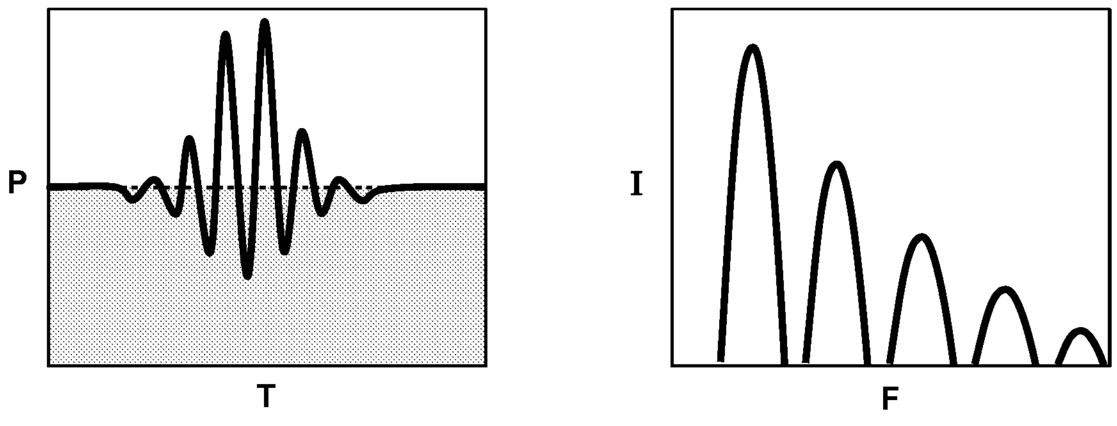

FIGS. 5A and 5B illustrates a comparison between a symmetric and asymmetric pressure pulse (P) as function of time (T) and intensity (I) of the associated frequency spectrum (F). In a preferred embodiment, effective bandwidth can be increased in the asymmetric pulse (FIG. 5B), e.g. by forcing the membrane displacement to be more nonlinear, specifically by inducing displacement asymmetry.

Aspects of the present disclosure can be embodied as a method of boosting an effective bandwidth in a membrane based ultrasonic transducer. Some embodiments make use of a control element C disposed on one or both sides of a membrane to increase or decrease a displacement amplitude of the membrane towards that side and/or the opposite side. This may induce a displacement asymmetry in a motion of the membrane during its vibration either side.

In some embodiments, such as described in FIGS. 1A and 1B, the control element C changes, e.g. decreases, a displacement amplitude Za of the first membrane 10 towards the first side 10a, compared to the second side 10b by pressure forces of a fluid being compressed by the displacement in a pocket formed on the first side 10a.

In other or further embodiments, such as described in FIGS. 2A and 2B, the control element C changes, e.g. decreases or increases, an equilibrium position and/or displacement amplitude Za of the first membrane 10 towards the first side 10a, compared to the second side 10b, or vice versa, by continuous and/or alternating (dynamic) electrostatic forces exerted on the first membrane 10 by the control element C.

In other or further embodiments, such as described in FIGS. 3A and 3B, the control element C changes an equilibrium position and/or displacement amplitude Zb of the first membrane 10 towards the second side 10b compared to the first side 10a, by a physical connection (exclusively) to a center of the first membrane 10 on the first side 10a, which allows the inward displacement of the first membrane 10 towards the first side 10*a* but constrains the displacement to the second side 10*b*.

In other or further embodiments, the control element dynamically affects a force and/or stiffness of the first membrane 10, e.g. using multiple piezoelectric layers 10*p*, 10*q*, which are differently actuated during a respective vibrational cycle such as described in FIGS. 4A and 4B, or by variable electrostatic forces such as described with reference to FIGS. 2A and 2B.

For the purpose of clarity and a concise description, features are described herein as part of the same or separate embodiments, however, it will be appreciated that the scope of the invention may include embodiments having combinations of all or some of the features described. Of course, it is to be appreciated that any one of the above embodiments or processes may be combined with one or more other embodiments or processes to provide even further improvements in finding and matching designs and advantages. It is appreciated that this disclosure offers particular advantages to increasing bandwidth in membrane based transducers, and in general can be applied for any application wherein resonant transducers are used.

In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different item(s) or implemented structure or function; any of the disclosed devices or portions thereof may be combined together or separated into further portions unless specifically stated otherwise. Where one claim refers to another claim, this may indicate synergetic advantage achieved by the combination of their respective features. But the mere fact that certain measures are recited in mutually different claims does not indicate that a combination of these measures cannot also be used to advantage. The present embodiments may thus include all working combinations of the claims wherein each claim can in principle refer to any preceding claim unless clearly excluded by context.

The invention claimed is:

1. An ultrasonic transducer comprising:

at least a first membrane configured to exhibit a first vibration to transceive ultrasonic waves;

an electronic circuit coupled to the first membrane and configured to transceive electrical signals causing, or caused by, the first vibration; and a control element disposed on a first side of the first membrane and configured to induce a displacement asymmetry, in a motion of the first membrane during the first vibration, to the first side compared to a second side opposite the first side, wherein the control element is actively controlled during a respective cycle of the first vibration so as to vary, during specific parts of said respective cycle, at least one of a force exerted on the first membrane or a stiffness of the first membrane, thereby inducing the displacement asymmetry.

2. The ultrasonic transducer according to claim 1, wherein the membrane comprises a first piezoelectric layer for transceiving the electrical signals related to the first vibration of the first membrane.

3. The ultrasonic transducer according to claim 2, wherein the electronic circuit is configured to transmit a first electrical signal to the first piezoelectric layer of the first membrane for causing the first vibration, wherein the electronic circuit is configured to transmit a different, second electrical signal to the control element for dynamically affecting the membrane displacement during a respective vibration cycle of the first vibration caused by the first electrical signal.

4. The ultrasonic transducer according to claim 2, wherein the control element comprises an electrostatic device configured to generate electrostatic charges on a surface of the first membrane comprising the first piezoelectric layer, and on another opposing surface adjacent the first membrane.

5. The ultrasonic transducer according to claim 4, wherein the electrostatic charge is generated on a second membrane.

6. The ultrasonic transducer according to claim 4, wherein the electrostatic device is configured to generate an alternating signal of electrostatic charges, wherein the application of electrostatic charges is synchronized with the first vibration of the first membrane.

7. The ultrasonic transducer according to claim 6, wherein the electrostatic device is configured to further include a continuous signal, or offset in the alternating signal, for applying the electrostatic charges, wherein the electrostatic charges are configured to change an equilibrium position of at least the first membrane.

8. The ultrasonic transducer according to claim 4, wherein the electrostatic charge affects a stiffness of the first membrane.

9. The ultrasonic transducer according to claim 1, wherein the control element is configured to reduce an amplitude of the first membrane in one of the directions, towards the first side or the second side, compared to the opposite direction.

10. The ultrasonic transducer according to claim 1, wherein the control element comprises a connection structure that is connected exclusively to a center of the first membrane on the first side, wherein the connection structure comprises a foldable structure configured to fold or slack during displacement of the first membrane towards the first side and to pull tight beyond a threshold displacement towards the second side, such that the connection structure allows the displacement of the first membrane towards the first side but constrains the displacement of the first membrane towards the second side beyond the threshold displacement.

11. The ultrasonic transducer according to claim 2, wherein the first vibration has:

a first amplitude between an equilibrium position of the first membrane and a maximum extended position of the first membrane to the first side, and a second amplitude between the equilibrium position and a maximum extended position of the first membrane to the second side, wherein the control element is configured to affect the motion of the first membrane for inducing a difference between the first and second amplitudes of at least five percent.

12. The ultrasonic transducer according to claim 2, wherein the control element comprises a second piezoelectric layer, wherein the electronic circuit is configured to actuate the second piezoelectric layer to dynamically change a characteristic of the first membrane during a part of a vibration cycle of the first membrane, wherein a first electric signal is sent to the first piezoelectric layer and a different, second electric signal is sent to the second piezoelectric layer.

13. The ultrasonic transducer according to claim 2, wherein the control element comprises a second piezoelectric layer, wherein the electronic circuit is configured to actuate the second piezoelectric layer during specific parts of the first vibration, exclusively during respective half cycles in one of the directions of the vibration cycle, to counter or blunt displacement in said one direction.

14. The ultrasonic transducer according to claim 4, wherein the electrostatic device is configured to generate the electrostatic charges only during one half of each cycle of the vibrating first membrane.

15. The ultrasonic transducer according to claim 1, wherein the control element is configured such that a pressure pulse generated by the first membrane is deformed in one displacement direction relative to an opposite displacement direction and has an associated frequency spectrum of increased effective bandwidth.

16. An ultrasonic transducer comprising:

at least a first membrane configured to exhibit a first vibration to transceive ultrasonic waves;

an electronic circuit coupled to the first membrane and configured to transceive electrical signals causing, or caused by, the first vibration; and a control element disposed on a first side of the first membrane and configured to induce a displacement asymmetry, in a motion of the first membrane during the first vibration, to the first side compared to a second side opposite the first side, wherein the control element comprises a second membrane disposed parallel to the first membrane with a closed pocket there between, wherein the closed pocket contains a fluid, resisting compression when the closed pocket contracts, causing a non-linear force on the first membrane as a function of its displacement towards the second membrane for inducing the displacement asymmetry.

17. The ultrasonic transducer according to claim 16, wherein the electronic circuit is configured to actuate the second membrane to exhibit a second vibration that is in counter-phase with the first vibration, wherein the membranes are configured to simultaneously move apart from each other, or move towards each other, without directly contacting each other.

18. The ultrasonic transducer according to claim 16, wherein at least the first membrane has a relatively thick and/or stiff section covering a subsection of the membrane at a center of the membrane of between fifty and ninety percent of a total area of the membrane, wherein the center of the membrane is thicker and/or has higher stiffness compared to an edge of the membrane by at least a factor 1.1.

* * * * *